G. W. McMILLON.
Bee-Hive.
No. 198,137.                     Patented Dec. 11, 1877.
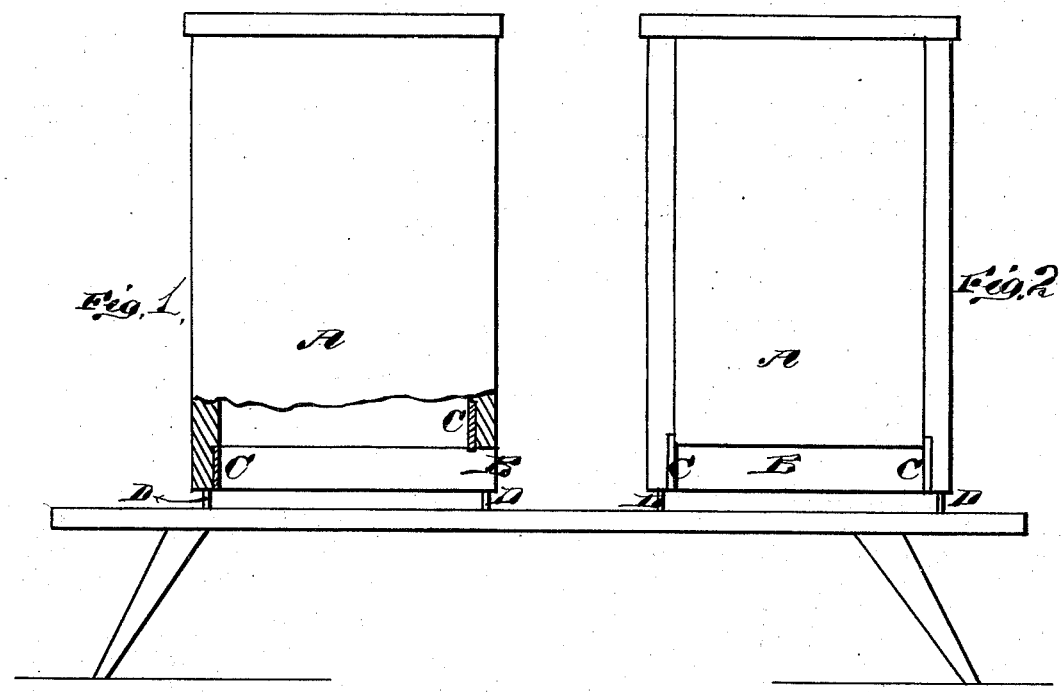
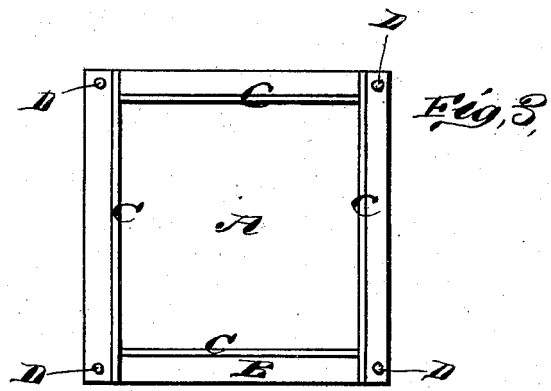

UNITED STATES PATENT OFFICE.

GEORGE W. McMILLON, OF MANCHESTER, TENNESSEE.

IMPROVEMENT IN BEE-HIVES.

Specification forming part of Letters Patent No. 198,137, dated December 11, 1877; application filed September 1, 1877.

*To all whom it may concern:*

Be it known that I, GEORGE W. McMILLON, of Manchester, in the county of Coffee and State of Tennessee, have invented a new and valuable Improvement in Moth-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical sectional view of my moth-trap. Fig. 2 is a side view, and Fig. 3 is a plan view, thereof.

My invention relates to bee-hives; and consists in providing the hive with supporting-standards, and at the bottom with an interior lining of glass or equivalent material, which will effectually prevent the moth-worm from passing up into the hive, as will be hereinafter more fully set forth.

The annexed drawing, to which reference is made, fully illustrates my invention.

A represents a bee-hive of any suitable construction, provided with the bee-entrance B. C represents a glass lining inserted in the inside of the bottom of the hive, and extending one or one and a half inch, more or less, up the inside of the hive, as shown.

The fly that deposits the egg that makes the worm or moth invariably deposits under the bottom of the hive, if there is a place for hiding. Such hiding-place I provide in my hive by raising the hive one-quarter of an inch from the bench at the four corners of the hive, by means of projecting pins D D, or other equivalent means.

When the worm comes out it will make an effort to get up into the hive, but in vain, as it cannot crawl across the glass; so the worms soon die and disappear. At the same time the glass does not interfere in the least with the bees, as they can readily go over it.

This forms a simple, and yet thoroughly effective moth-protector. When applied to old hives it will prevent all the moths that get down on the bench from getting back.

In a full-sized hive I propose to have a net-work extending from side to side, near the bottom, at the top of the glass lining, so as to prevent any comb being built to the bench.

What I claim as new, and desire to secure by Letters Patent, is—

A bee-hive having supporting-standards D, for raising the hive proper a short distance above the bench, and a glass lining inserted on the inside of the lower ends of the hive, substantially as and for the purposes set forth.

In testimony that I claim the above I have hereunto subscribed my name in the presence of two witnesses.

GEORGE W. McMILLON.

Witnesses:
JOHN CHAIN,
W. V. FLEMING.